United States Patent
Fujii et al.

(10) Patent No.: US 10,110,110 B2
(45) Date of Patent: Oct. 23, 2018

(54) POWER CONVERSION DEVICE

(71) Applicants: MITSUBISHI ELECTRIC CORPORATION, Chiyoda-ku (JP); TOSHIBA MITSUBISHI-ELECTRIC INDUSTRIAL SYSTEMS CORPORATION, Chuo-Ku (JP)

(72) Inventors: Toshiyuki Fujii, Chiyoda-ku (JP); Takushi Jimichi, Chiyoda-ku (JP); Kaho Mukunoki, Chiyoda-ku (JP); Ryosuke Uda, Chiyoda-ku (JP); Taichiro Tsuchiya, Chuo-Ku (JP); Akihiro Matsuda, Chuo-Ku (JP); Hisanori Taguchi, Chuo-Ku (JP)

(73) Assignees: MITSUBISHI ELECTRIC CORPORATION, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/559,859

(22) PCT Filed: Mar. 24, 2016

(86) PCT No.: PCT/JP2016/059435
§ 371 (c)(1),
(2) Date: Sep. 20, 2017

(87) PCT Pub. No.: WO2016/152989
PCT Pub. Date: Sep. 29, 2016

(65) Prior Publication Data
US 2018/0062498 A1  Mar. 1, 2018

(30) Foreign Application Priority Data
Mar. 26, 2015 (JP) .................. 2015-063792

(51) Int. Cl.
*H02M 1/08* (2006.01)
*H02M 7/12* (2006.01)
(Continued)

(52) U.S. Cl.
CPC ............ *H02M 1/08* (2013.01); *H02H 7/1252* (2013.01); *H02M 1/32* (2013.01); *H02M 7/12* (2013.01);
(Continued)

(58) Field of Classification Search
CPC ........... H02M 2001/0009; H02M 1/08; H02M 7/217; H02H 7/1252
See application file for complete search history.

(56) References Cited

U.S. PATENT DOCUMENTS

| | | | |
|---|---|---|---|
| 9,515,569 B2 * | 12/2016 | Garcia-Soto | ............ H02M 1/32 |
| 9,866,120 B2 * | 1/2018 | Koyanagi | ............... H02M 1/32 |
| 2009/0195068 A1 * | 8/2009 | Ohashi | ................. H03K 17/162 |
| | | | 307/18 |
| 2011/0019442 A1 * | 1/2011 | Yamada | .................. H02M 1/14 |
| | | | 363/44 |

(Continued)

FOREIGN PATENT DOCUMENTS

| | | |
|---|---|---|
| JP | 2011-182517 A | 9/2011 |
| JP | 5386185 B2 | 1/2014 |

(Continued)

OTHER PUBLICATIONS

International Search Report dated Jun. 7, 2016, in PCT/JP2016/059435 filed Mar. 24, 2016.

(Continued)

*Primary Examiner* — Jeffrey Gblende
*Assistant Examiner* — David A. Singh
(74) *Attorney, Agent, or Firm* — Oblon, McClelland, Maier & Neustadt, L.L.P.

(57) ABSTRACT

When switching operations of converter cells are stopped due to temporary voltage reduction in an AC system, a voltage determination unit performs determination regarding a voltage of each DC capacitor after a predetermined (Continued)

period has passed, and a charge control unit transmits a charging gate signal, via a gate control unit, to select a converter cell at a voltage level at which a self-feeding circuit of the converter cell is operable. Thus, a DC capacitor of a converter cell whose voltage is lower than the voltage level at which a self-feeding circuit is operable is charged, thereby enabling switching operations of all the converter cells.

8 Claims, 3 Drawing Sheets

(51) Int. Cl.
*H02M 7/49* (2007.01)
*H02H 7/125* (2006.01)
*H02M 7/217* (2006.01)
*H02M 1/32* (2007.01)
*H02M 1/00* (2006.01)
*H02M 7/483* (2007.01)

(52) U.S. Cl.
CPC ............ *H02M 7/217* (2013.01); *H02M 7/49* (2013.01); *H02M 2001/0006* (2013.01); *H02M 2001/0009* (2013.01); *H02M 2007/4835* (2013.01)

(56) References Cited

U.S. PATENT DOCUMENTS

| | | | | |
|---|---|---|---|---|
| 2011/0089770 | A1* | 4/2011 | Zhong | H01F 29/14 307/412 |
| 2012/0026767 | A1* | 2/2012 | Inoue | H02M 7/217 363/89 |
| 2015/0351188 | A1* | 12/2015 | Chen | H02M 1/44 315/200 R |
| 2016/0036314 | A1* | 2/2016 | Koyanagi | H02M 1/32 363/65 |
| 2016/0043626 | A1* | 2/2016 | Klyosov | H02M 1/08 363/132 |
| 2016/0190924 | A1* | 6/2016 | Koyanagi | H02M 7/483 323/271 |

FOREIGN PATENT DOCUMENTS

| | | |
|---|---|---|
| JP | 5397203 B2 | 1/2014 |
| WO | 2014/091801 A1 | 6/2014 |

OTHER PUBLICATIONS

Makoto Hagiwara et al., "Theoretical Analysis and Control of the Modular Multilevel Cascade Converter Based on Double-Star Chopper-Cells (MMCC-DSCC)," The Institute of Electrical Engineers of Japan, 2011, pp. 84-92, with Extended Summary, p. 12.

* cited by examiner

POWER CONVERSION DEVICE

TECHNICAL FIELD

The present invention relates to a power conversion device which is used in, for example, a large capacity AC-DC conversion apparatus for DC power transmission, a reactive power compensation apparatus for reducing reactive power of an AC system, etc., and which is connected to a plural-phase AC system. Particularly, the present invention relates to operation continuation control when AC voltage variation occurs due to fluctuation of the AC system.

BACKGROUND ART

Generally, in large-capacity power conversion devices, converter output is high voltage or large current. Therefore, many large-capacity power conversion devices are configured with a plurality of converter cells multiplexed in series or parallel. Multiplexing of converter cells realizes not only increase in converter capacity but also reduction in harmonics contained in an output voltage waveform by combining outputs thereof. As a result, harmonic current flowing into a system can be reduced.

As one of means for multiplexing converter cells, there is a multilevel converter in which outputs of a plurality of converter cells are connected in cascade, and one of such multilevel converters is a modular multilevel converter.

Each of arms of a modular multilevel converter is composed of a plurality of converter cells connected in cascade.

A first arm and a second arm for each of phases of the conventional modular multilevel converter each have chopper cells (converter cells) and a reactor. Each chopper cell includes two power semiconductor switching elements (hereinafter referred to as switching elements) connected in series to each other, and a DC capacitor connected in parallel thereto. In each of the first arm and the second arm, substantially the same number of chopper cells are connected in cascade via their respective output ends.

Control for each phase of the conventional modular multilevel converter includes: average value control of causing the average value of voltage values of all DC capacitors to follow a DC capacitor voltage command value; individual balance control for causing the voltage value of each DC capacitor to follow the DC capacitor voltage command value; and arm balance control for causing the average value of voltage values of all the DC capacitors in the first arm and the average value of voltage values of all the DC capacitors in the second arm to coincide with each other. A circulating current which circulates in the modular multilevel converter without flowing to the outside of the modular multilevel converter is controlled, and a voltage command value is calculated so as to control to control an AC current for each phase and a DC voltage command value is calculated so as to control a DC output terminal (e.g., Patent Document 1 and Non-Patent Document 1).

Regarding a power supply required for driving the switching elements constituting each chopper cell of the conventional modular multilevel converter, a self-feeding circuit is provided which obtains power from the DC capacitor of the converter cell, thereby to omit supply of power from the outside (e.g., Patent Document 2).

Further, when overvoltage of the DC capacitor occurs in the conventional power conversion device, an electric discharge circuit in which a resistor and a switch are connected in series is connected in parallel to the DC capacitor, and a current is caused to flow through the resistor by setting the switch of the electric discharge circuit in a conductive state, whereby electric energy stored in the DC capacitor is consumed to reduce the potential of the voltage of the DC capacitor (e.g., Patent Documents 3 and 4).

CITATION LIST

Patent Document

Patent Document 1: Japanese Laid-Open Patent Publication No. 2011-182517
Patent Document 2: WO 2014/091801 A1
Patent Document 3: Japanese Patent No. 5386185
Patent Document 4: Japanese Patent No. 5397203

Non-Patent Document

Non-Patent Document 1: IEEJ transactions D (on industry applications) Vol. 131, No. 1, 2011 (pages 84 to 92)

SUMMARY OF THE INVENTION

Problems to be Solved by the Invention

In the conventional power conversion device, the DC capacitor voltage is the same among the converter cells and therefore no variation occurs in the DC capacitor voltage in contrast to the modular multilevel converter. Thus, no problem occurs when the switching elements are cause to operate again. Meanwhile, in a case where the conventional modular multilevel converter is configured as an AC-DC conversation terminal, if fluctuation occurs in the AC system and the AC voltage decreases, the voltage of the DC capacitor of each converter cell changes due to the fluctuation in the AC power. At this time, the self-feeding circuit reaches the minimum voltage level at which the self-feeding circuit can supply power for driving the semiconductor switching elements, and switching of the semiconductor switching elements needs to be temporarily stopped. However, the voltage level of the DC capacitor varies among the respective converter cells, and the capacitor voltages are discharged due to internal loss while the switching operation is stopped. Therefore, when the temporarily stopped switching operation of the switching elements is resumed, there may be converter cells in which the self-feeding circuit is operable and converter cells in which the voltage of the DC capacitor is out of the operable range of the self-feeding circuit. As a result, there is a risk that the modular multilevel converter cannot be operated again.

The present invention has been made to solve the above problem, and an object of the present invention is to provide a power conversion device in which, when switching operations of converter cells are stopped due to temporary voltage reduction in an AC system, voltages of DC capacitors of all the converter cells are set to a voltage level at which self-feeding circuits thereof are capable, thereby reliably enabling the converter cells to operate again.

Solution to the Problems

A power conversion device according to the present invention includes: a plurality of converter cells connected in series so as to correspond to each of phases of a plural-phase AC system; and a control device capable of individually controlling operations of the converter cells. Each converter cell includes: a series connection circuit in which switching elements are connected in series to diodes connected in antiparallel; a DC capacitor connected in parallel to the series connection circuit and configured to smooth a DC voltage; and a self-feeding circuit configured to cause the switching elements to operate. The control device includes: a protection unit configured to temporarily stop switching operation of the switching elements when an output current from the converter cell is equal to or greater than a predetermined value or when a voltage of the DC capacitor is out of a predetermined range that allows the self-feeding circuit to operate; a voltage determination unit configured to determine whether or not the voltage of the DC capacitor is within the range that allows the self-feeding circuit to operate, every time a predetermined period has passed from the temporary stoppage of the switching operation by the protection unit; a charge control unit configured to select a converter cell that is determined to be operable by the voltage determination unit and cause the switching elements thereof to operate; and a gate control unit configured to resume the switching operation of the switching elements when the voltage determination unit has determined that voltages of all the DC capacitors are within the predetermined range.

Effect of the Invention

According to the present invention, the control device includes: the protection unit configured to temporarily stop switching operation of the switching elements when an output current from the converter cell is equal to or greater than a predetermined value or when the voltage of the DC capacitor is out of a predetermined range that allows the self-feeding circuit to operate; the voltage determination unit configured to determine whether or not the voltage of the DC capacitor is within the range that allows the self-feeding circuit to operate, every time a predetermined period has passed from the temporary stoppage of the switching operation by the protection unit; the charge control unit configured to select a converter cell that is determined to be operable by the voltage determination unit and cause the switching elements thereof to operate; and the gate control unit configured to resume the switching operation of the switching elements when the voltage determination unit has determined that voltages of all the DC capacitors are within the predetermined range. Therefore, even when the DC capacitor voltage varies among the respective converter cells, the variation is reduced when the switching elements are operated again, and the voltages of the DC capacitors of all the converter cells can be set to a voltage level at which the self-feeding circuits thereof are operable, thereby realizing a power conversion device in which the converter cells can be reliably operated again.

DESCRIPTION OF EMBODIMENTS

Figure 1:
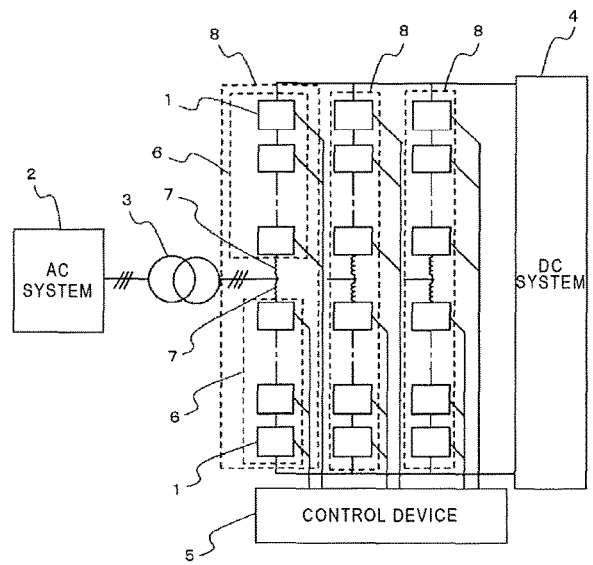
FIG. 1 is a schematic configuration diagram illustrating a power conversion device according to embodiment 1 of the present invention.

Hereinafter, embodiments of the present invention will be described. In the drawings, the same or the corresponding components are denoted by the same reference characters.

Embodiment 1

Figure 2:
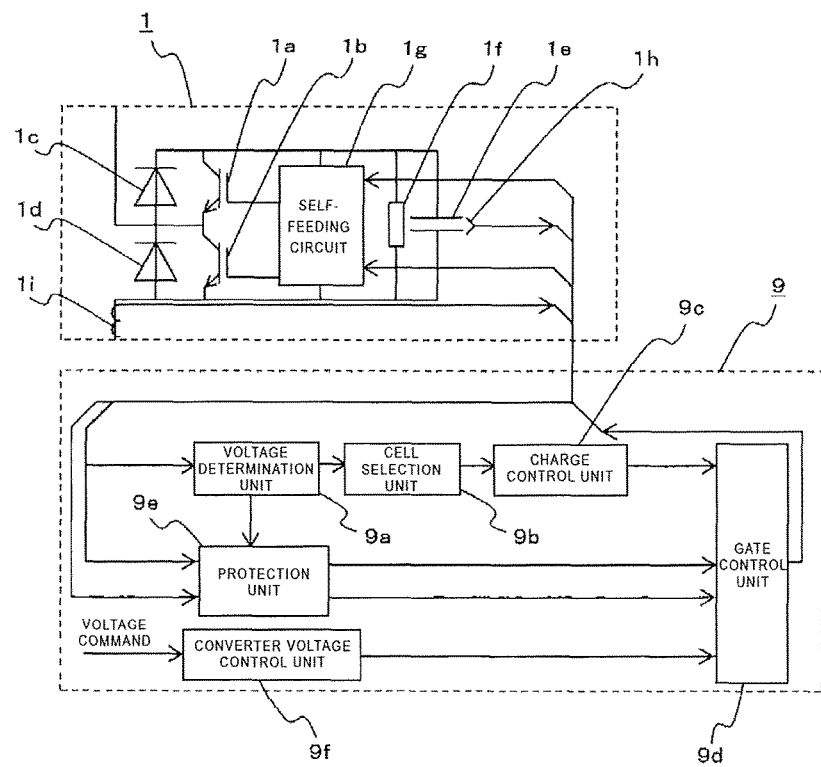
FIG. 2 is a block diagram illustrating configuration examples of a converter cell and a cell group controller in the power conversion device according to embodiment 1.
Figure 3A:
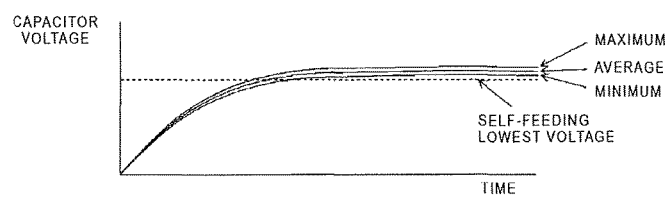
FIG. 3A is a diagram for explaining transition of a voltage of a DC capacitor when the power conversion device according to embodiment 1 of the present invention is started up.
Figure 3B:
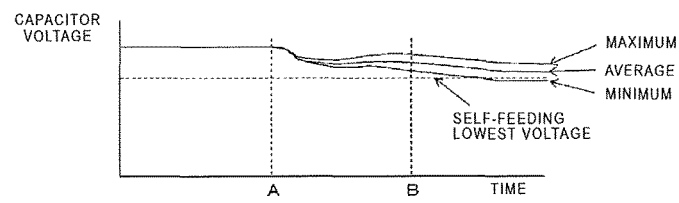
FIG. 3B is a diagram for explaining transition of the voltage of the DC capacitor when an AC system of the power conversion device according to embodiment 1 of the present invention causes instantaneous voltage reduction.

FIG. 1 is a schematic configuration diagram illustrating a power conversion device according to embodiment 1 of the present invention. FIG. 2 is a block diagram illustrating configuration examples of a converter cell and a cell group controller in the power conversion device according to embodiment 1 of the present invention. FIG. 3A is a diagram for explaining transition of a voltage of a DC capacitor when the power conversion device according to embodiment 1 of the present invention is started up. FIG. 3B is a diagram for explaining transition of the voltage of the DC capacitor when an AC system of the power conversion device according to embodiment 1 of the present invention causes instantaneous voltage reduction.

FIG. 1 is a schematic configuration diagram illustrating an example of an AC-DC conversion apparatus. A power conversion device includes leg circuits 8 as main circuits, and a control device 5 for controlling the leg circuits 8.

The leg circuits 8 are configured to correspond to the respective phases of a plural-phase AC system 2 (FIG. 1 shows a three-phase AC system), and perform AC-DC conversion of power between the AC system 2 and a DC system 4. The AC side of each leg circuit 8 is connected to the AC system 2 via an interconnection transformer 3, while the DC side thereof is connected to the DC system 4. As the DC system 4 in this case, another power conversion device performing DC output is applied. Each leg circuit 8 may be connected to the AC system 2 via an interconnection reactor, instead of using the interconnection transformer 3 shown in FIG. 1.

For each phase of the power conversion device, two cell groups 6, each being a series connection body composed of a plurality of converter cells 1 (described later in detail) connected in series, are connected in series, and a connection point of the cell groups 6 is connected to each phase AC line of the transformer 3 via a reactor 7, thereby forming a leg circuit 8. The opposed ends of each of the leg circuits 8 for the three phases are connected to the DC system 4. One of the two cell groups 6 forming the leg circuit 8 of each phase is a positive-side cell group while the other cell group 6 is a negative-side cell group.

The position where the reactor 7 is inserted may be any position in each leg circuit 8, and a plurality of the reactors 7 may be inserted in each leg circuit 8. In addition, the respective reactor values may be different from each other. In an extreme case, reactors 7 may be inserted only in the positive-side cell group or only in the negative-side cell group.

Next, configuration examples of each converter cell 1 and a cell group controller 9 formed in the control device 5 will be described with reference to FIG. 2.

The converter cell 1 having the configuration shown in FIG. 2 is a converter cell 1 in which a half-bridge configuration is employed. The converter cell 1 is configured as follows. That is, a plurality of (two in the case of FIG. 2) power semiconductor switching elements 1a and 1b (hereinafter referred to as switching elements), to which diodes 1c and 1d are respectively connected in antiparallel, are connected in series to form a series connection circuit. A DC capacitor 1e for smoothing a DC voltage is connected in parallel to the series connection circuit. A resistor 1f and a self-feeding circuit 1g are connected in parallel to the DC capacitor 1e.

As each of the switching elements 1a and 1b, a self-turn-off switching element such as an IGBT (Insulated Gate Bipolar Transistor) or a GCT (Gate Commutated Turn-off thyristor) is used.

In each converter cell 1, an anode terminal of the diode 1d, and a terminal connecting an anode terminal of the diode 1c and a cathode terminal of the diode 1d are output terminals. Through ON/OFF control of the switching elements 1a and 1b, both-end voltage of the DC capacitor 1e and zero voltage are outputted from the output terminals.

The converter cell 1 is provided with a voltage director 1h for detecting the voltage of the DC capacitor 1e, and a current detector 1i for detecting the current of the output terminal, and transmits the detected values thereof to the cell group controller 9. A gate signal for controlling ON/OFF of the switching elements 1a and 1b is transmitted from the cell group controller 9, and the switching states of the switching elements 1a and 1b are controlled by use of the power supplied from the self-feeding circuit 1g.

The cell group controller 9 has a control function of controlling the corresponding cell group 6. A voltage command corresponding to the voltage to be outputted from the output terminal is generated outside or inside the control device 5. In response to the voltage command, a converter voltage control unit 9f generates a normal operation gate control signal for controlling ON/OFF of the switching elements 1a and 1b, and transmits the signal to a gate control unit 9d. On the basis of the magnitude of the DC voltage detected by the voltage detector 1h of each converter cell 1, the magnitude of the current detected by the current detector 1i of each converter cell 1, and the result of determination of a voltage determination unit 9a, a protection unit 9e outputs and transmits, to the gate control unit 9d, either a gate-on signal indicating normal operation or a charge command signal instructing charge control for the voltage of the DC capacitor.

The voltage determination unit 9a evaluates the magnitude of the DC voltage of each converter cell 1, determines whether or not the DC voltage is at a DC voltage level at which the switching elements 1a and 1b are controllable, and transmits a result of the determination to a cell selection unit 9b and the protection unit 9e. On the basis of the result of the determination by the voltage determination unit 9a, the cell selection unit 9b selects a converter cell 1 to be subjected to charge control, and transmits the result of the selection to the charge control unit 9c. The charge control unit 9c generates a charging gate control signal for ON/OFF control of the switching elements 1a and 1b of the selected converter cell 1, and transmits the signal to the gate control unit 9d. On the basis of the states of the charge command signal and the gate-on signal, the gate control unit 9d selects either the normal gate control signal or the charging gate control signal, and transmits the gate signal to each converter cell 1.

In the configuration example of FIG. 2, each converter cell 1 is provided with the current detector 1i for detecting the current of the output terminal of the converter cell 1. However, since each cell group 6 is a series connection body composed of the converter cells 1, the current detector 1i of any one of the converter cells 1 may be used. Further, instead of providing the current detector 1i in each converter cell 1, one current detector 1i may be provided for each cell group 6.

Next, control operation of the cell group controller 9 of the control device 5 will be described.

In the configuration shown in FIG. 1, each cell group 6 outputs an AC voltage component corresponding to the AC voltage of the AC system 2, and a DC voltage component corresponding to the DC system 4. Since each cell group 6 is composed of the converter cells 1 connected in series, each converter cell 1 takes part of each of the voltage components, and a series-combined voltage corresponds to the voltage to be outputted from the cell group 6. In FIG. 2, since operation is performed so that the time average value of the DC capacitor 1e is at a substantially constant voltage level, pulse width modulation (PWM) is generally applied in the converter voltage control unit 9f for controlling the output voltage, whereby a desired output voltage is obtained. In the power converter shown in FIG. 1, for the purpose of suppressing distortion in the output voltage from the cell group 6, switching timings of the switching elements 1a and 1b in the respective converter cells 1 are controlled to be temporally shifted among the converter cells 1.

The protection unit 9e operates to perform protection so as to prevent the switching elements 1a and 1b from operating beyond the current level at which the switching elements are switchable, and further prevent the switching elements 1a and 1b, the DC capacitor 1e, and the self-feeding circuit 1g from operating beyond a predetermined DC voltage level. Specifically, when determining that the magnitude of the detected value of the output current from each converter cell 1 is equal to or greater than an overcurrent defection value, the protection unit 9e sets the gate-on signal corresponding to a normal operation instruction in a reactive state, thereby to stop the switching operation of the switching elements (gate block state). Further, when the detected value of the voltage detector 1h which detects the voltage of the DC capacitor 1e of each converter cell 1 becomes equal to or greater than an overvoltage detected value or becomes equal to or less than a low-voltage detected value, the protection unit 9e sets the gate-on signal in the reactive state in the same manner as described above.

When a predetermined period has passed after the gate-on signal was once set in the reactive state, the protection unit 9e determines whether the magnitude of the detected value of the output current from each converter cell 1 is smaller than the overcurrent detection value, whether the detected value of the voltage of the DC capacitor 1e in each converter cell 1 is smaller than the overvoltage detected value, and whether the detected value of the voltage of the DC capacitor 1e is greater than the low-voltage detected value. When all the above conditions are satisfied, the protection unit 9e sets the gate-on signal in an active state, so that the switching states of the switching elements 1a and 1b are controlled according to the normal operation gate control signal outputted from the converter voltage control unit 9f.

Voltage variation in the AC system 2 is conceivable as a situation that causes an event that allows the gate-on signal to be in the active state again after the protection unit 9e performed overcurrent detection, overvoltage detection, and low-voltage detection and thereby the gate-on signal was temporally in the reactive state. Voltage variation in the AC system 2 is caused by events such as instantaneous voltage reduction due to lightning, and introduction or parallel-out of a transmission line, a transformer, a phase modifier, etc. in/from the AC system 2. When voltage variation occurs in the AC system 2, a difference voltage between the voltage outputted from the cell group 6 and the voltage of the AC system 2 increases, and the voltage applied to the reactor 7 and the transformer 3 increases. This voltage increase mainly acts as an inductance voltage of the reactor 7 and the transformer 3, and as a result, the current flowing in the reactor 7 and the transformer 3 increases. Since the cell group 6 is composed of the switching elements 1a and 1b repeating ON and OFF and the DC capacitor 1e and therefore has a low impedance, the current flowing in the reactor 7 and the transformer 3 also flows to the cell group 6. The greater the difference voltage is, the greater the current flowing to the cell group 6 is, whereby overcurrent is detected. When the great current flows to the DC capacitor 1e, overvoltage and/or low-voltage are detected.

In order to avoid breakage of the switching elements 1a and 1b due to the transient current and voltage caused by voltage variation in the AC system 2, the predetermined period is set in consideration of a period during which the transient current and voltage converge. Other factors to be considered when the predetermined period is set are as follows: time required for detection of the output current from each converter cell 1 and detection of the voltage of the DC capacitor 1e; time required until information about the detected output current of each converter cell 1 and the detected voltage of the DC capacitor 1e is transmitted to the protection unit 9e; and time required for processing of the cell group controller 9.

Regarding the overcurrent of the output current, since the cell groups 6 are connected in series, it is obvious that the same current flows in the respective converter cells 1. However, regarding the voltage of the DC capacitor 1e which is caused by flow of the current, this voltage varies among the converter cells 1 because the switching timings of the switching elements 1a and 1b in the converter cells 1 are not the same but are temporally shifted from each other, and because the potentials of the DC capacitors 1e in the converter cells 1 are not the same but vary depending on the operating state. For example, in a case where instantaneous voltage reduction occurs in the AC system 2 and thereby a voltage difference occurs, the protection unit 9e compares a voltage value at the lowest voltage level among the DC voltages of the converter cells 1, with a DC low-voltage set value, and sets the gate-on signal in the reactive state. In this case, the DC voltage levels of the converter cells 1 are held in the varied states. If the switching elements 1a and 1b are turned off with the voltage of the AC system 2 being reduced, the converter cell 1 enters a voltage holding state because, in the half-bridge cell as shown in FIG. 2, charging via the diode 1c cannot be performed unless the output voltage is higher than the voltage level of the DC capacitor 1e. However, the voltage of the DC capacitor 1e is gradually discharged and reduced due to the function of the resistor 1f connected in parallel to the DC capacitor 1e as shown in FIG. 2.

The resistor 1f functions to suppress variation in the voltage due to variation in the leakage current from the DC capacitor 1e. The effect of this function will be described with reference to FIG. 3A, for example. In a case where the DC capacitor 1e is initially charged with the power from the AC system 2, the switching elements 1a and 1b of each converter cell 1 are turned off, whereby a current flows in the diode 1c and electric charges are accumulated in the DC capacitor 1e. Therefore, considering that the same current flows in the respective converter cells 1, the voltage of the DC capacitor 1e converges, with time, within a range of variation designed with the resistor 1f. The self-feeding circuit is designed so as to be operable with an allowance with respect to the lowest voltage level of the charged voltage levels of the DC capacitor 1e. The average value of the charged DC voltages regarding the respective converter cells 1 is a value proportional to the voltage level of the AC system 2, and is designed according to the voltage of the AC system 2 which is stationary operated.

Meanwhile, as described above, if the protection unit 9e detects a low voltage during operation of the power conversion device shown in FIG. 1 and sets the gate-on signal in the reactive state, there is a risk that greater variation than in charging may occur. This risk will be described with an example of transition of the voltage of the DC capacitor 1e with time, when the AC system 2 generates instantaneous voltage reduction at time point A, as shown in FIG. 3B, for example. When reduction in the voltage of the AC system 2 occurs, the voltage of the DC capacitor 1e of each converter cell 1 may have greater variation than in charging, due to influences of the AC voltage variation and the converter voltage control unit 9f. The protection unit 9e detects a low voltage at time point B and sets the gate-on signal in the reactive state, and then if the magnitude of the AC voltage is smaller than the voltage value obtained by combining the voltages of the DC capacitors 1e of the respective converter cells 1, no current flows in the diode 1c, the variation is maintained, and the DC capacitor 1e is gradually discharged. Even when the AC voltage is recovered to the state where a charge current flows in the diode 1c, if the AC voltage is not overvoltage and is at the voltage level of normal operation, the variation is not solved and the DC capacitor 1e is gradually discharged due to the effect of the resistor 1f although the average value of the capacitor voltages of the respective converter cells 1 reaches the voltage level in charging. After the predetermined period has passed, when the protection unit 9e performs determination regarding the DC voltage of each converter cell 1, there is a possibility that a converter cell 1 whose DC voltage level is lower than the operable level of the self-feeding circuit may exist, and as a result, the gate-on signal cannot be set in the active state again.

In this case, in the cell group controller 9, the gate-on signal is set in the reactive state, and when the predetermined period has passed, determination regarding the voltage level of the DC capacitor 1e of each converter cell 1 is performed to select a converter cell 1 in which the self-feeding circuit is operable. The average value of the voltages of the DC capacitors 1e in the respective converter cells 1 is at a voltage level at which each self-feeding circuit is operable with an allowance, if the voltage of the AC system 2 has been recovered to the voltage level at which stationary operation is performed. Therefore, the voltages of the DC capacitors 1e in at least half of the converter cells 1 included in each cell group 6 are at the voltage level at which the self-feeding circuits thereof are operable. The cell selection unit 9b selects all or part of the converter cells 1 whose self-feeding circuits are operable, and transmits information about the selected cells to the charge control unit 9c. The charge control unit 9c transmits, to the gate control unit 9d, a gate control signal that turns off the switching element 1a and turns on the switching element 1b, as a gate signal for each converter cell 1 selected by the cell selection unit 9b. In parallel with this operation, when the gate-on signal is set in the active state again after the predetermined period has passed from when the gate-on signal was set in the reactive state, the voltage determination unit 9a determines that there is a converter cell 1 whose capacitor voltage is lower than the low-voltage detection level, and sets a charging completion signal in an incomplete state and transmits the signal to the protection unit 9e.

Then, the protection unit 9e determines that the changing completion signal is in the incomplete state, changes the charge command from the charging completion signal to the charging state, and transmits the charge command to the gate control unit 9d. When the gate-on signal is in the reactive state and the charge command is in the charging state, the gate control unit 9d transmits, to each converter cell 1, the gate control signal outputted from the charge control unit 9c, as a gate signal for each converter cell 1. When the switching element 1b of each converter cell 1 is turned on, the output voltage of the converter cell 1 is in a zero voltage output state, and no current passes the DC capacitor 1e. Thus, the voltage of the cell group 6, which is obtained by combining the output voltages of the respective converter cells 1, is reduced, and a phase section (near a peak of the normal AC system voltage) lower than the voltage level of the AC system 2 occurs, whereby a potential difference occurs between the voltage of the AC system 2 and the combined voltage of the cell group 6, and a current flows in the transformer 3. Further, this current flows in the cell group 6. That is, the current flows in the diode 1c of the converter cell 1 whose switching element 1b is not turned on, whereby the corresponding DC capacitor 1e can be charged to increase the DC voltage.

When the predetermined period has passed from when the DC capacitor 1e entered the charging state, the voltage determination unit 9a determines that the DC voltages of all the converter cells 1 are equal to or higher than the voltage level at which the self-feeding circuits are operable, and changes the charging completion signal from the incomplete state to the complete state. Further, upon determining the charging complete state, the protection unit 9e changes the charge command from the charging state to the charging complete state, and transmits the charge command to the gate control unit 9d. Thus, when the charge command is in the charging complete state, the gate control unit 9d sets the gate signal for each converter cell 1 in an OFF state from the charging gate control signal, thereby to turn off all the switching elements 1a and 1b. Thereafter, simultaneously with or after a certain time lag from when the charging completion signal has become the complete state, the protection unit 9e sets the gate-on signal in the active state and transmits the gate-on signal to the gate control unit 9d. Upon receiving the gate-on signal, the gate control unit 9d selects the normal operation gate signal transmitted from the converter voltage control unit 9f, and transmits the gate signal to the respective converter cells 1. Upon completion of the switching operation described above, the power conversion device shown in FIG. 1 is restored to the normal operation state. In the normal operation state, the power conversion device is operated so that the time average value of the voltages of the DC capacitors 1e is at a substantially constant voltage level, whereby it is possible to obtain a desired AC voltage of the AC system 2 and a desired DC voltage of the DC system 4.

As described above, in the case where voltage fluctuation occurs in the AC system 2 and the switching operation of the switching elements 1a and 1b is temporarily stopped, even when the voltages of the DC capacitors 1e of the respective converter cells 1 are held in the varied states and there is a converter cell 1 whose voltage is smaller than the voltage level at which the self-feeding circuit thereof is operable, it is possible to charge the DC capacitor 1e of the converter cell 1 and resume the switching operation of the switching elements 1a and 1b thereof. Therefore, it is not necessary to discharge the DC capacitor 1e to a voltage level near 0 V and start initial charging of all the DC capacitors 1e again. As a result, operation continuation performance of the power conversion device is improved.

While the converter cell 1 shown in FIG. 2 is configured as a half-bridge circuit in the above description, the converter cell 1 may be configured as a full-bridge circuit with the same operation as described above.

Further, in the above description, instantaneous reduction in the voltage of the AC system 2 is described as an example of a case where the protection unit 9e detects overcurrent, overvoltage, or low-voltage and thereby makes the gate-on signal reactive. In any case, however, as long as the power conversion device can be activated again after such a failure is eliminated, the effect of improving the operation continuation performance of the power conversion device can be achieved. As another failure that allows the power conversion device to be activated again, there is instantaneous overvoltage of the AC system 2.

Further, when the number of the converter cells 1 is large, delay of communication from the gate control unit 9d may vary among the respective converter cells 1. In this case, transition to the gate block state will also vary among the respective converter cells 1, which may cause the voltages of the DC capacitors 1e to vary. Even in such a situation, the effect of improving the operation continuation performance of the power conversion device is achieved.

Embodiment 2

Figure 4:
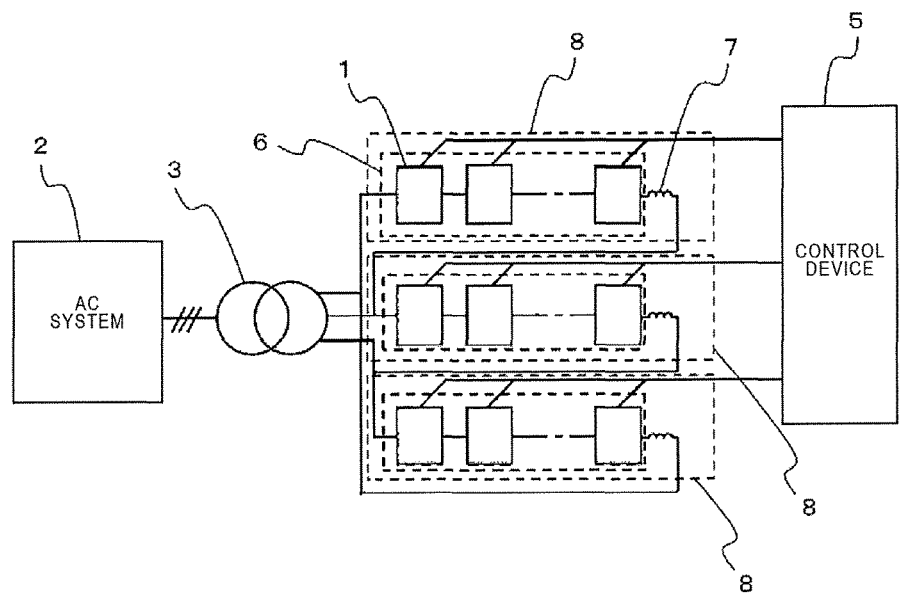
FIG. 4 is a schematic configuration diagram illustrating a power conversation device according to embodiment 2 of the present invention.
Figure 5:
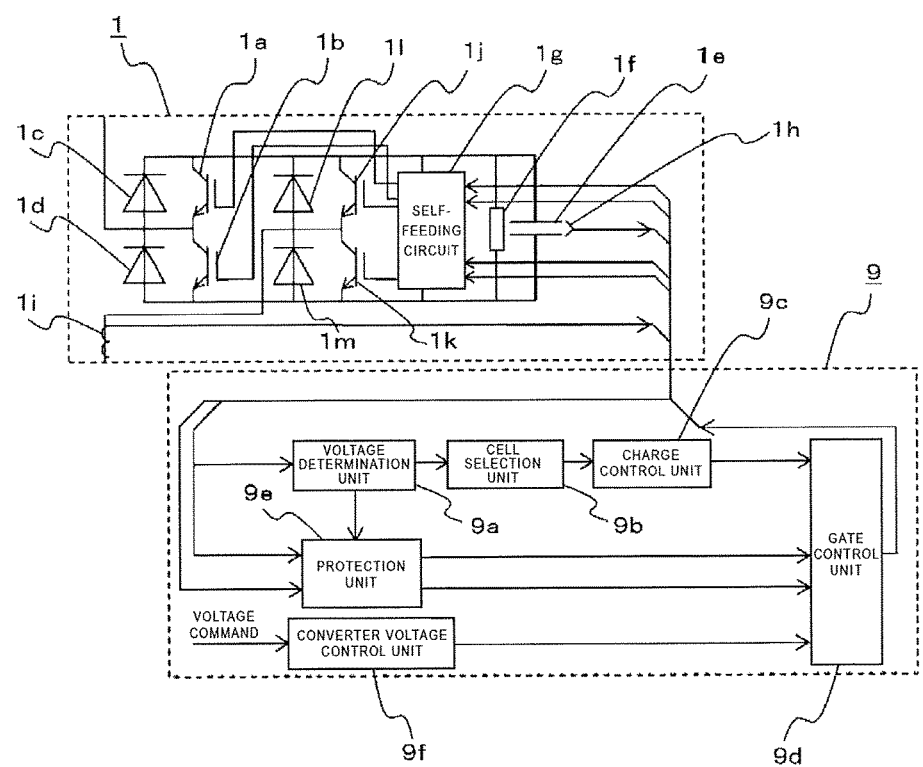
FIG. 5 is a block diagram illustrating configuration examples of a converter cell and a cell group controller in the power conversion device according to embodiment 2 of the present invention.

FIG. 4 is a schematic configuration diagram illustrating a power conversion device according to embodiment 2 of the present invention. FIG. 5 is a block diagram illustrating configuration examples of a converter cell and a cell group controller in the power conversion device according to embodiment 2 of the present invention. In embodiment 1 described above, as an example of an AC-DC conversion apparatus, a structure has been described in which each of the phases of the AC system 2 is connected to a connection point of two cell groups 6, each being a series connection body of converter cells, connected in series in each leg circuit 8. However, in embodiment 2, as an example of a reactive power compensation apparatus, a structure will be described in which three leg circuits 8 are connected in delta connection, and each of connection points thereof is connected to each phase of the AC system 2.

FIG. 4 is a schematic configuration diagram showing an example of a reactive power compensation apparatus. In FIG. 4, each leg circuit 8 of the power conversion device is provided between the phases of a plural-phase AC system 2 (specifically, a three-phase AC system in FIG. 4), and is connected to the AC system 2 via an interconnection transformer 3. For each phase of the power conversion device, the cell group 6 and a reactor 7 connected in series is connected between the AC lines of the transformer 3 to form the leg circuit 8, and the respective leg circuits 8 corresponding to the three phases are connected in delta connection to form a short-circuited DC loop circuit. In addition, connection to the AC system 2 may be performed via an interconnection reactor, instead of using the interconnection transformer 3 shown in FIG. 4. The reactive power compensation apparatus is usually operated so that a DC loop current that flows in the loop circuit short-circuited by delta connection is substantially zero. However, when a reactive power is generated in the AC system 2, the DC loop current is applied to reduce the reactive power.

The converter cell 1 having the structure shown in FIG. 5 is a converter cell 1 adopting the full-bridge configuration. The converter cell 1 is composed of the following components connected in parallel: a series connection circuit in which a plurality of (four in this case) switching elements 1a, 1b and switching elements 1j, 1k are respectively connected in series with respect to a circuit in which diodes 1c, 1d and diodes 1l, 1m are connected in antiparallel; a DC capacitor 1e which is connected in parallel to the series connection circuit, and smooths a DC voltage; a resistor 1f; and a self-feeding circuit 1g.

Each of the switching elements 1a, 1b, 1j, and 1k is, as in embodiment 1, formed of a self-turn-off switching element such as an IGBT (Insulated Gate Bipolar Transistor) or a GCT (Gate Commutated Turn-off thyristor).

As shown in FIG. 5, in each converter cell 1, a terminal at which an anode terminal of the diode 1c is connected to a cathode terminal of the diode 1d and a terminal at which an anode terminal of the diode 1l is connected to a cathode terminal of the diode 1m are output terminals. Through ON/OFF control of the switching elements 1a, 1b, 1j, and 1k, positive and reversed polarities of both-end voltage of the DC capacitor 1e and a zero voltage are outputted from the output terminals.

The converter cell 1 is provided with a voltage detector 1h for detecting a voltage of the DC capacitor 1e, and a current detector 1i for detecting a current of the output terminal, and transmits the detected values thereof to the cell group controller 9. A gate signal for controlling ON/OFF of the switching elements 1a, 1b, 1j, and 1k is transmitted from the cell group controllers 9, and the switching states of the switching elements 1a, 1b, 1j, and 1k are controlled by use of the power supplied from the self-feeding circuit 1g.

Although the cell group controller 9 is provided with the control function for controlling the corresponding cell group 6, description of the cell group controller 9 is omitted because embodiment 2 is identical to embodiment 1 except that each converter cell 1 has the full-bridge configuration and therefore the number of the switching elements is different from the of embodiment 1.

Next, control operation of the cell group controller 9 of the control device 5 according to embodiment 2 will be described in detail below.

In the structure shown in FIG. 4, each cell group 6 outputs an AC voltage component corresponding to a voltage between AC lines of the AC system 2. Each cell group 6 is composed of the converter cells 1 connected in series. Each converter cell 1 takes part of the voltage component, and a series-combined voltage corresponds to a voltage to be outputted from the cell group 6. In FIG. 5, since operation is performed so that the time average value of the DC capacitor 1e is at a substantially constant voltage level, pulse width modulation (PWM) is generally applied in the converter voltage control unit 9f for controlling the output voltage to obtain a desired output voltage. In the power converter shown in FIG. 4, for the purpose of suppressing distortion in the output voltage from the cell group 6, switching timings of the switching elements 1a, 1b,1j, and 1k in the respective converter cells 1 are controlled to be temporarily shifted among the converter cells 1.

The operations of the voltage determination unit 9a, the cell selection unit 9b, the gate control unit 9d, the protection unit 9e, and the converter voltage control unit 9f in the cell group controller 9 shewn in FIG. 5 are identical to those of embodiment 1, and therefore description thereof is omitted. The charge control unit 9c outputs, to the gate control unit 9d, either a gate control signal for turning on the switching elements 1b and 1k of all or part of the converter cells 1 (whose self-feeding circuits are operable) selected by the cell selection unit 9b, or a gate control signal for turning on the switching elements 1a and 1l thereof. Thus, the voltage of the cell group 6, which is obtained by combining the output voltages of the respective converter cells 1, is reduced, and a phase section lower than the AC voltage level occurs, whereby a current flows to the diodes 1c and 1m of converter cell 1 in which the switching elements are not ON, and thus the corresponding DC capacitor 1e can be charged to increase the DC voltage.

As described above, also in embodiment 2, in the case where voltage fluctuation occurs in the AC system 2 and switching operations of the switching elements 1a, 1b, 1j, and 1k are temporarily stopped, even when the voltages of the DC capacitors 1e of the respective converter cells 1 are held in the varied states and there is a converter cell 1 whose voltage is smaller than the voltage level at which the self-feeding circuit 1g thereof is operable, it is possible to charge the DC capacitor 1e of the converter cell 1 and resume the switching operations of the switching elements 1a, 1b, 1j, and 1k thereof. Thus, it is not necessary to discharge the DC capacitor 1e to a voltage level near 0 V and start initial charging for all the DC capacitors 1e again. As a result, operation continuation performance of the power conversion device is improved.

Embodiment 3

In embodiment 1 described above, the charge control unit 9c transmits the charging gate signal to all or part of the converter cells 1 selected by the cell selection unit 9b. In embodiment 3, the charge control unit 9c outputs a charging gate signal successively to the converter cells 1 selected by the cell selection unit 9b, one by one, in order from a converter cell 1 having the highest DC voltage.

With the configuration as described above, a potential difference that occurs at one time between the voltage of the AC system 2 and the voltage of the cell group 6 when charging is performed is restricted to the DC voltage charged to the DC capacitor 1e of one converter cell 1, whereby the magnitude of the charge current is suppressed, and occurrence of overcurrent during charging is inhibited. While in embodiment 3 the number of converter cells to be subjected to gate control at one time is one, even when a plurality of converter cells are successively subjected to gate control at one time, a potential difference that occurs at one time can be suppressed. The interval of the successive gate control may be set to a predetermined value. Alternatively, gate control may be progressed upon determining that the magnitude of the output current is equal to or less than a predetermined value.

As described above, according to embodiment 3, in addition to the effects of embodiment 1 or 2, the current during charging can be suppressed to a minimum value, whereby the operation continuation performance of the power conversion device is improved. Since the other components are the same as those in embodiment 1, description thereof is omitted.

It is noted that, within the scope of the present invention, the above embodiments may be freely combined with each other, or each of the above embodiments may be modified or simplified as appropriate.

DESCRIPTION OF THE REFERENCE CHARACTERS 1 converter cell
1a switching element

1*b* switching element
1*c* diode
1*d* diode
1*e* DC capacitor
1*f* resistor
1*g* self-feeding circuit
1*h* voltage detector
1*i* current detector
2 AC system
3 transformer
4 DC system
5 control device
6 cell group
7 reactor
8 leg circuit
9 cell group controller
9*a* voltage determination unit
9*b* cell selection unit
9*c* charge control unit
9*d* gate control unit
9*e* protection unit
9*f* converter voltage control unit

The invention claimed is:

1. A power conversion device comprising:
a plurality of converter cells connected in series to correspond to each of phases of a plural-phase AC system, and a control device capable of individually controlling operations of the converter cells,
each converter cell comprising:
a series connection circuit in which switching elements are connected in series to diodes connected in antiparallel;
a DC capacitor connected in parallel to the series connection circuit and configured to smooth a DC voltage; and
a self-feeding circuit configured to cause the switching elements to operate, the control device comprising:
a protection controller configured to temporarily stop switching operation of the switching elements when an output current from the converter cell is equal to or greater than a predetermined value or when a voltage of the respective DC capacitor is out of a predetermined range that allows the respective self-feeding circuit to operate;
a voltage determiner configured to determine whether or not the voltage of each DC capacitor of the DC capacitors is within the range that allows the self-feeding circuits to operate, every time a predetermined period has passed from the temporary stoppage of the switching operation by the protection controller;
a charge controller configured to select a converter cell that is determined to be operated by the voltage determiner and cause the switching elements thereof to operate; and
a gate controller configured to resume the switching operation of the switching elements when the voltage determiner has determined that voltages of all the DC capacitors are within the predetermined range.

2. The power conversion device according to claim 1, wherein the converter cell selected by the charge controller is set in a zero voltage output state by the switching operation of the switching elements.

3. The power conversion device according to claim 1, wherein a connection point, at which two series connection bodies each including a plurality of the converter cells are connected in series, is connected to each of the phases of the AC system, and remaining opposed ends of the series connection bodies are connected to a DC system.

4. The power conversion device according to claim 1, wherein three series connection bodies each including a plurality of the converter cells are connected in delta connection, and each of connection points thereof is connected to each of the phases of the AC system.

5. The power conversion device according to claim 1, wherein the protection controller temporarily stops the switching operation of the switching elements when a detected value of the output current of the converter cell is greater than a detected value of overcurrent, or when a detected value of the voltage of the DC capacitor is greater than the detected value of the overvoltage, or when the detected value of the voltage of the DC capacitor is less than a detected value of a low voltage.

6. The power conversion device according to claim 5, wherein the protection controller temporarily stops the switching operation of the switching elements when the voltage of the AC system instantaneously generates overvoltage or when the voltage of the AC system instantaneously decreases.

7. The power conversion device according to claim 1, wherein the charge controller causes the switching elements of the selected converter cell to successively operate.

8. The power conversion device according to claim 1, wherein the charge controller restricts the number of the switching elements to be simultaneously operated to a predetermined number.

* * * * *